(12) United States Patent
Paterek et al.

(10) Patent No.: US 7,745,725 B2
(45) Date of Patent: Jun. 29, 2010

(54) ELECTRIC POWER TERMINAL FEED-THROUGH

(75) Inventors: Franz Dieter Paterek, Vroomshoop (NL); Albertus Jan Hendrik Kolkman, Erm (NL); Scott Schuckmann, Maineville, OH (US)

(73) Assignee: Emerson Electric Co., St. Louis, MO (US)

( * ) Notice: Subject to any disclaimer, the term of this patent is extended or adjusted under 35 U.S.C. 154(b) by 382 days.

(21) Appl. No.: 11/988,270

(22) PCT Filed: Jul. 5, 2006

(86) PCT No.: PCT/US2006/026235

§ 371 (c)(1),
(2), (4) Date: Jan. 4, 2008

(87) PCT Pub. No.: WO2007/005981

PCT Pub. Date: Jan. 11, 2007

(65) Prior Publication Data

US 2009/0120686 A1        May 14, 2009

Related U.S. Application Data

(60) Provisional application No. 60/696,684, filed on Jul. 5, 2005.

(51) Int. Cl.
*H01J 15/00* (2006.01)

(52) U.S. Cl. .............. 174/50.52; 174/50.59; 174/50.63; 174/152 GM; 439/926

(58) Field of Classification Search ............... 174/50.52, 174/50.59, 50.63, 152 GM; 439/935, 926, 439/621, 685, 282
See application file for complete search history.

(56) References Cited

U.S. PATENT DOCUMENTS

| 3,495,028 | A | * | 2/1970 | Tutthill | 174/153 R |
|---|---|---|---|---|---|
| 5,493,073 | A | * | 2/1996 | Honkomp | 174/152 GM |
| 5,584,716 | A |   | 12/1996 | Bergman | |
| 6,114,633 | A |   | 9/2000 | Duhancik | |
| 6,140,592 | A | * | 10/2000 | Paterek et al. | 174/152 GM |

FOREIGN PATENT DOCUMENTS

| JP | 09-045992 A2 | 2/1997 |
|---|---|---|
| JP | 11-288854 A2 | 10/1999 |
| KR | 20-1983-0002462 Y1 | 11/1983 |

* cited by examiner

*Primary Examiner*—Dhiru R Patel
(74) *Attorney, Agent, or Firm*—Harness, Dickey & Pierce, P.L.C.

(57) ABSTRACT

A power terminal feed-through incorporates a metallic body through which extend one or more current conducting pins that are hermetically sealed to the metallic body by a glass-to-metal seal. The metallic body includes an annular lip with a protrusion. During welding installation of the power terminal feed-through, the protrusion serves to assist in the welding process, better controlling the location and definition of the weld between the metallic body and a housing, and to focus the welding heat at the protrusion, thereby protecting the glass-to-metal seal. The glass-to-metal seal can be a single glass insert through which the current conducting pins extend, thereby reducing the pin circle diameter and the overall size of the power terminal feed-through.

17 Claims, 9 Drawing Sheets

ELECTRIC POWER TERMINAL FEED-THROUGH

FIELD OF THE DISCLOSURE

The present disclosure relates to electric power terminal feed-throughs, particularly of the type which include one or more current conducting pins projecting through a metallic body, with opposite ends of the pins disposed on either side of the body and the pins secured to the body by means of a glass-to-metal hermetic seal.

BACKGROUND OF THE DISCLOSURE

Hermetically sealed electric power terminal feed-throughs provide an airtight electrical feed-through for use in conjunction with hermetically sealed devices where leakage into or from such devices, by way of the feed-throughs, is effectively precluded. For the terminal feed-throughs to function safely and effectively for their intended purpose, the terminal feed-throughs require that their conductor pins be electrically insulated from and hermetically sealed to the body through which they pass and that an optimum air path be established and thereafter maintained between adjacent pins and opposite sides of the body.

Referring to FIG. 1, a typical electrical power terminal feed-through 10 for a fractional compressor application is shown to be installed to a housing 12 (e.g. a compressor shell), which defines an opening 14. The feed-through 10 includes a metal cap 16 having a bottom wall 18, a cylindrical sidewall 20 around the bottom wall 18, and an annular flange 22 extending from the cylindrical sidewall 20. The cylindrical sidewall 20 is disposed within the opening 14. The bottom wall 18 includes a plurality of apertures 24 through which a plurality of current-conducting pins 26 are disposed. A plurality of insulating seals 28 are disposed in the apertures 24 to seal the plurality of current-conducting pins 26 to the metal cap 16.

The feed-through 10 is installed to the housing 12 by resistance welding. Resistance welding refers to the joining of two or more pieces of metal by applying heat and pressure without the addition of any other material. Welding heat is generated when the parts to be welded, which are placed between two electrodes, resist the passage of electric current between the two electrodes, while pressure refines the grain structure in the parts. This combination of pressure and heat causes the parts to be welded to coalesce without actually liquefying. As clearly shown in FIG. 2, by using an upper electrode 30 and a lower electrode 32 to press the annular flange 22 against the housing 12 and by directing electric current through the electrodes 30 and 32, a weld 34 is formed at the contacting area between the housing 12 and the annular flange 22 so as to secure the feed-through 10 to the housing 12.

Installing the prior art feed-through 10 to the housing 12 by resistance welding creates the possibility that excessive heat may be generated which may migrate through the cylindrical sidewall 20 and the annular flange 22 to the insulating seals 28, particularly if the installer (e.g., the compressor manufacturer) does not exercise due care in handling and installing the feed-through. If excessive heat migrates to the insulating seals 28 during the welding process, there is a potential that the integrity of insulating seals 28 may be compromised and thereby become susceptible to leakage.

Moreover, the forces applied by the electrodes 30 and 32 to the typical feed-through are not aligned, causing a bending moment around the contacting area where the weld 34 is to be formed. The bending moment may tend to deform the annular flange 22 and change the welding location on the feed-through 10, making the positioning of the feed-through 10 relative to the housing 12 and thus the welding process more difficult.

Recent developments in hermetic power terminal feed-throughs, particularly those for use in refrigeration and air conditioning compressor applications, though substantially improving performance and providing more efficient operation, have required the compressor manufacturers to exercise greater care in handling and installing the feed-throughs during assembly. In particular, the compressor manufacturers' welding techniques, equipment selection (including welders and welding electrodes) and control settings, are especially critical for achieving proper installation of the feed-through.

Improper installation of the feed-through is to be avoided, since such practice can cause damage to the feed-through and undesirable feed-through failures. For example, welding with improper equipment or under improper control settings can result in making the feed-through more susceptible to heat shock, diminishing the robustness of the glass-to-metal seal due to the abrupt expansion and contraction of the metallic body, pins and/or insulating material. Therefore, there is a need for an electric power terminal feed-through which can be reliably and easily manufactured and installed.

SUMMARY OF THE DISCLOSURE

The following description of the preferred embodiment(s) is merely exemplary in nature and is in no way intended to limit the invention, its application, or uses.

In one preferred form, an electric power terminal feed-through adapted to be installed to a housing, comprises a metallic body, at least one current conducting pin extending through the metallic body, and a seal sealing the pin to the metallic body. The metallic body includes a cylindrical sidewall and an annular lip extending outwardly from an end of the sidewall. The annular lip is so configured that the annular lip engages the housing at a location away from the cylindrical sidewall.

In another form, an electric power terminal feed-through comprises a metallic body, at least one current conducting pin extending through the metallic body, and a seal sealing the pin to the metallic body. The metallic body includes an outer cylindrical sidewall having a first end and a second end, an annular lip extending from the second end of the outer cylindrical sidewall, an inner cylindrical sidewall, and a connecting wall connecting the inner cylindrical sidewall to the first end of the outer cylindrical sidewall. The seal is disposed within an opening defined by the inner cylindrical sidewall.

In still another form, an electric power terminal feed-through comprises a metallic body through which extend one or more current conducting pins that are sealed to the body by a glass-to-metal seal. The metallic body comprises a means for facilitating welding the terminal to a housing.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

Figure 1:
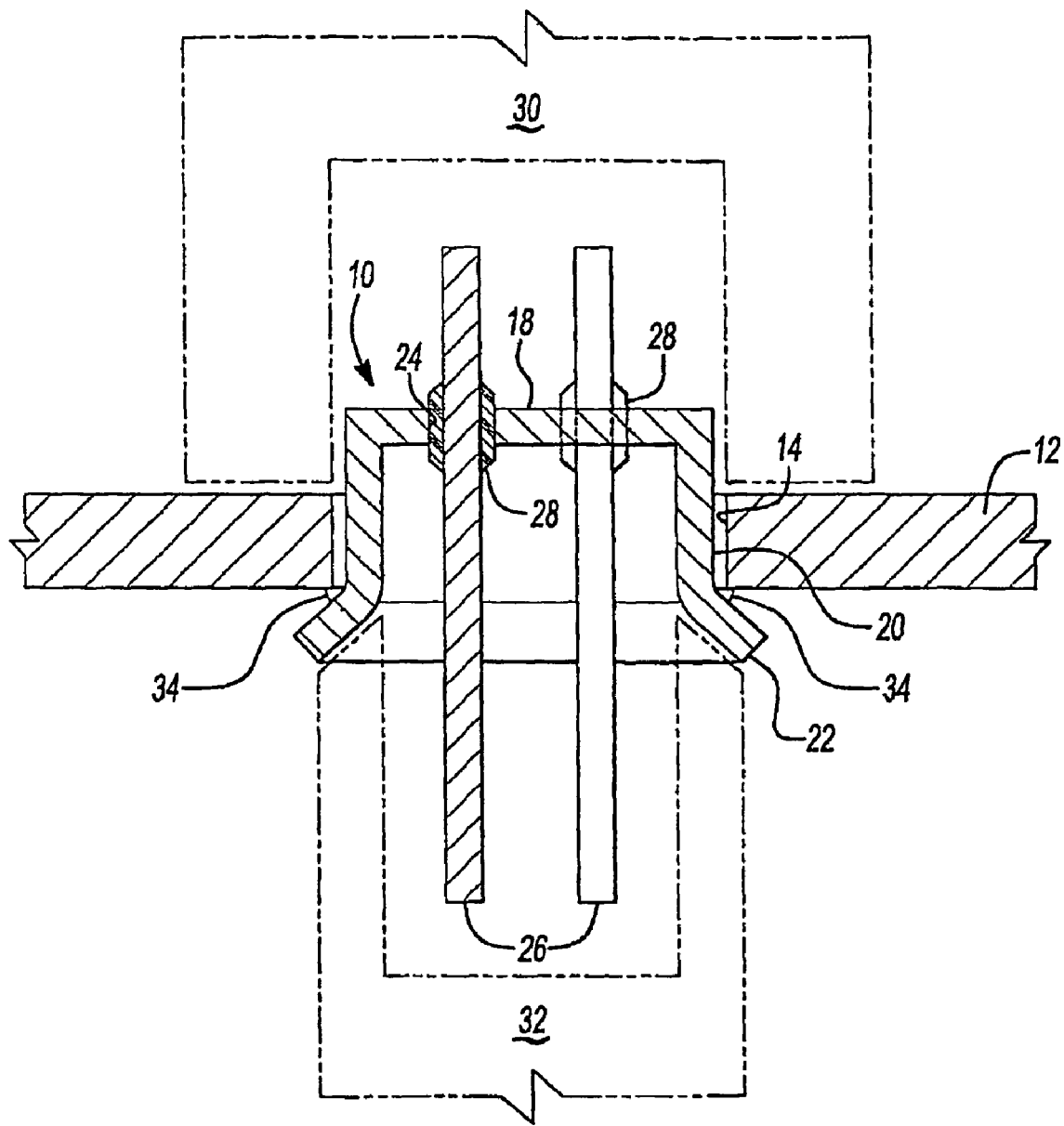
FIG. 1 is a cross-sectional view of a conventional electric power terminal feed-through assembled to a housing via welding.
Figure 2:
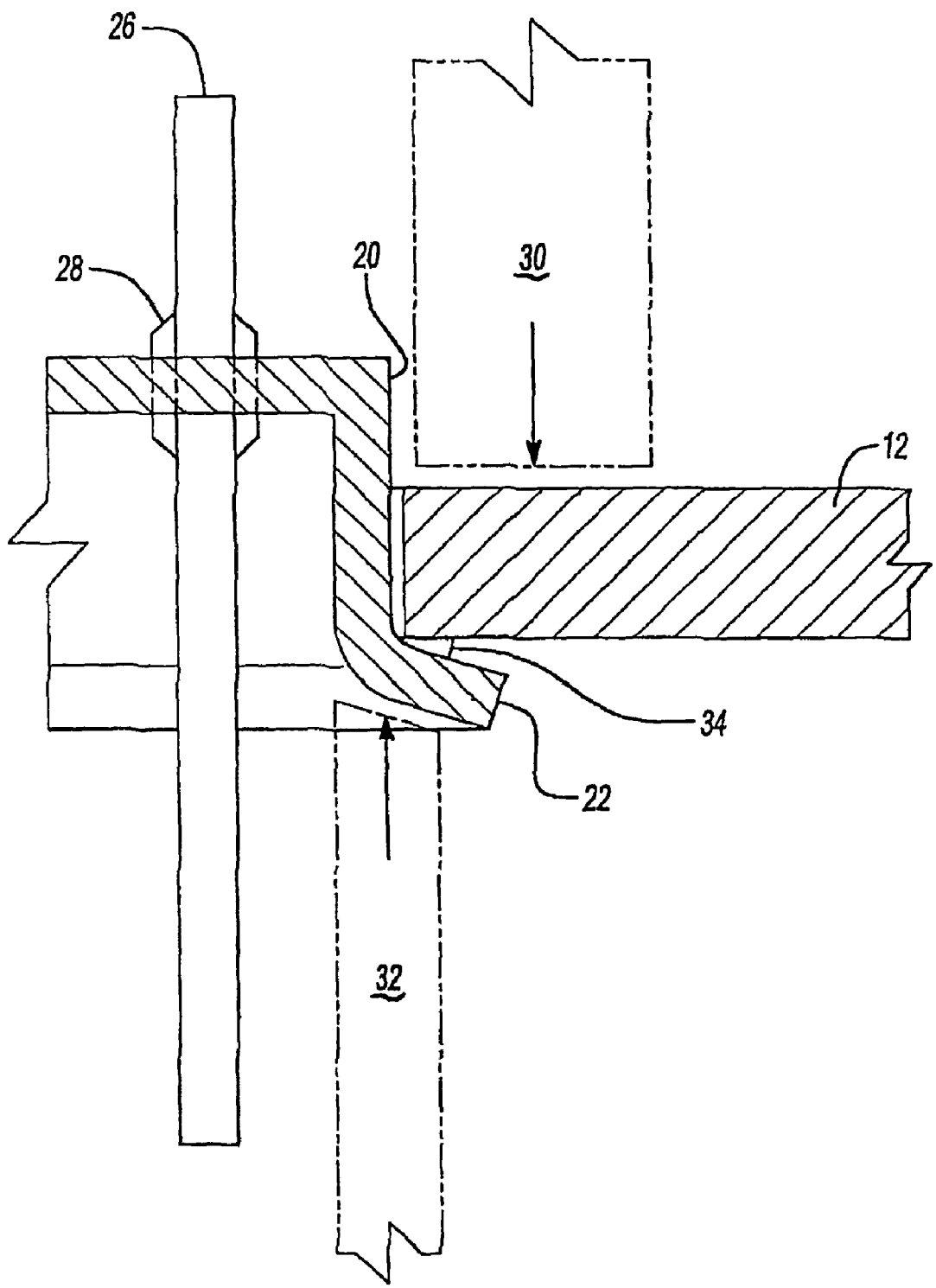
FIG. 2 is an enlarged partial cross-sectional view of FIG. 1, showing the weld between the feed-through and the housing and the forces applied to the feed-through during installation.

The following description is merely exemplary in nature and is not intended to limit the present disclosure, application, or uses. It should be understood that throughout the drawings, corresponding reference numerals indicate like or corresponding parts and features.

Figure 3:
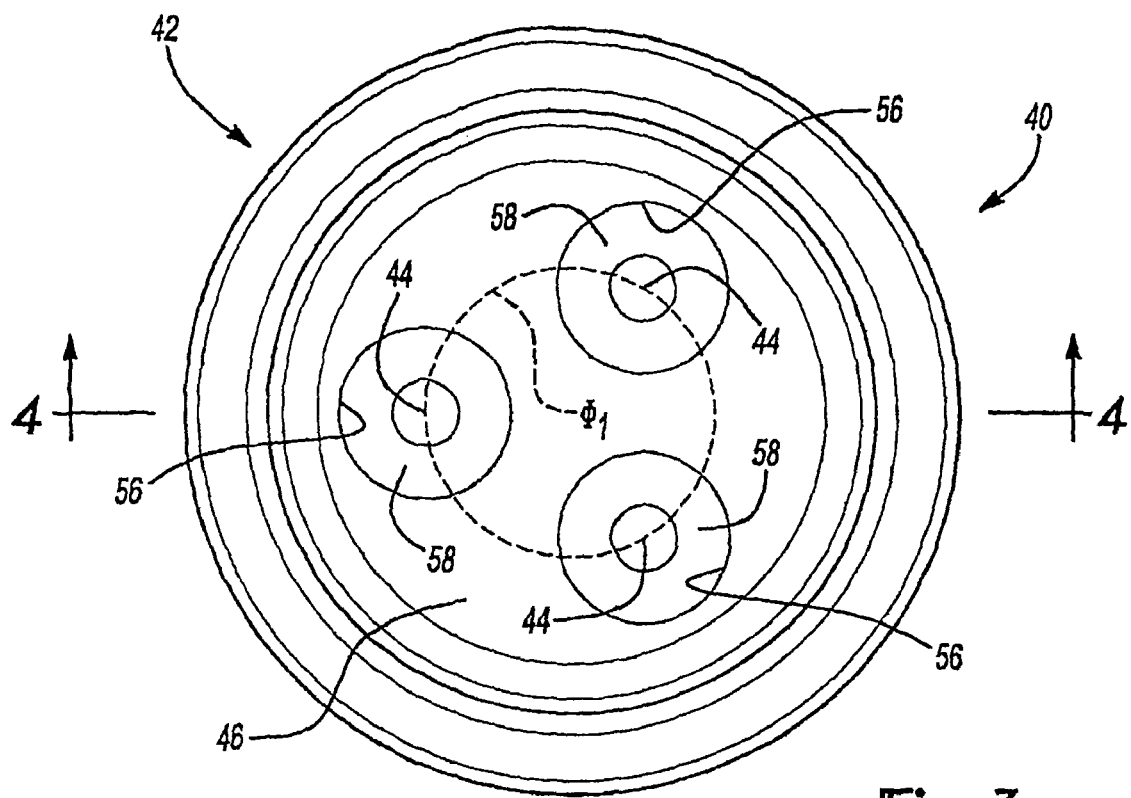
FIG. 3 is a top view of an electric power terminal feed-through in accordance with a first embodiment of the present disclosure.
Figure 4:
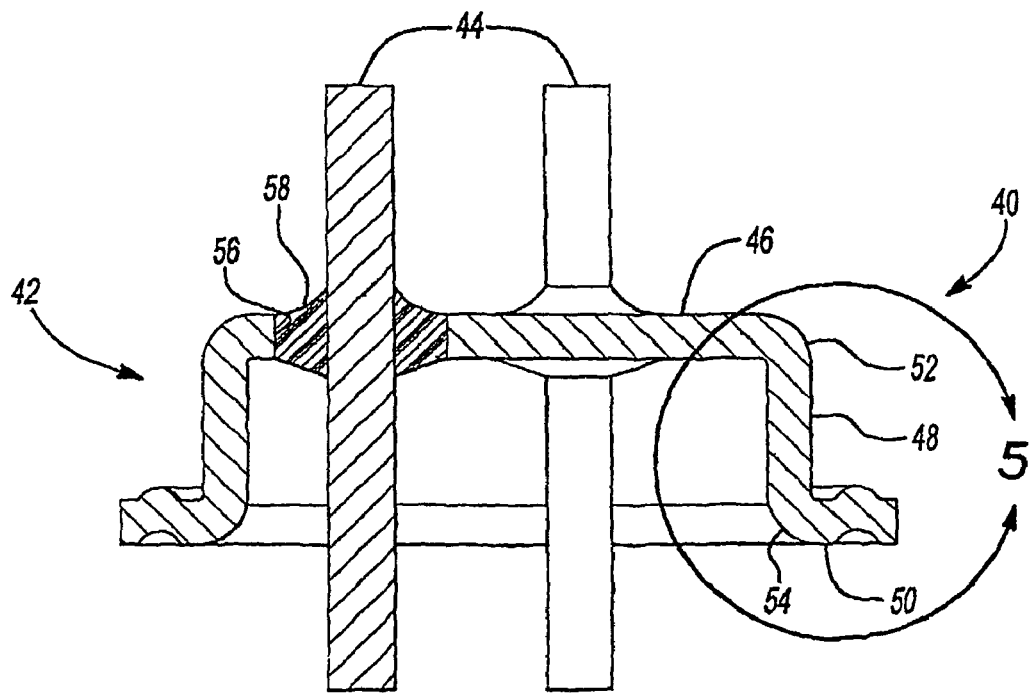
FIG. 4 is a cross-sectional view of the electric power terminal feed-through taken along line 4-4 of FIG. 3.

Referring to FIGS. 3 and 4, an electric power terminal feed-through constructed in accordance with a first embodiment of the present disclosure is illustrated and generally indicated by reference numeral 40. The power terminal feed-through 40 includes a metallic body 42, and one or more current conducting pins 44 extending through the metallic body 42 (three conducting pins 44 are shown in FIG. 3). The current-conducting pins 44 define a pin circle diameter $\phi_1$, which is the dimension of the circle passing through the centers of the current-conducting pins 44 as they are centered and spaced on a longitudinal axis of the power terminal feed-through 40. The current conducting pins 44 are preferably made from steel, stainless steel, or a copper-cored steel wire.

As shown, the metallic body 42 is cup-shaped and includes a bottom wall 46, a cylindrical sidewall 48 disposed around the bottom wall 46, and an annular lip 50 extending from the cylindrical sidewall 48. The cylindrical sidewall 48 includes a first end 52 and a second end 54. The bottom wall 46 is connected to the first end 52 of the cylindrical sidewall 48. The annular lip 50 extends radially and outwardly from the second end 54 of the cylindrical sidewall 48. The bottom wall 46 is substantially planar and defines one or more apertures 56 to allow the one or more current-conducting pins 44 to pass through.

A plurality of seals 58, preferably glass-to-metal seals, corresponding to the plurality of apertures 56 of the bottom wall 46 are individually provided in the apertures 56 to fill the gap between the current-conducting pins 44 and the bottom wall 46 so that the current-conducting pins 44 are electrically insulated from and hermetically sealed to the metallic body 42. The glass seal 58 is preferably made from a glass that provides good sealing, adhesion and corrosion resistance.

Figure 5:
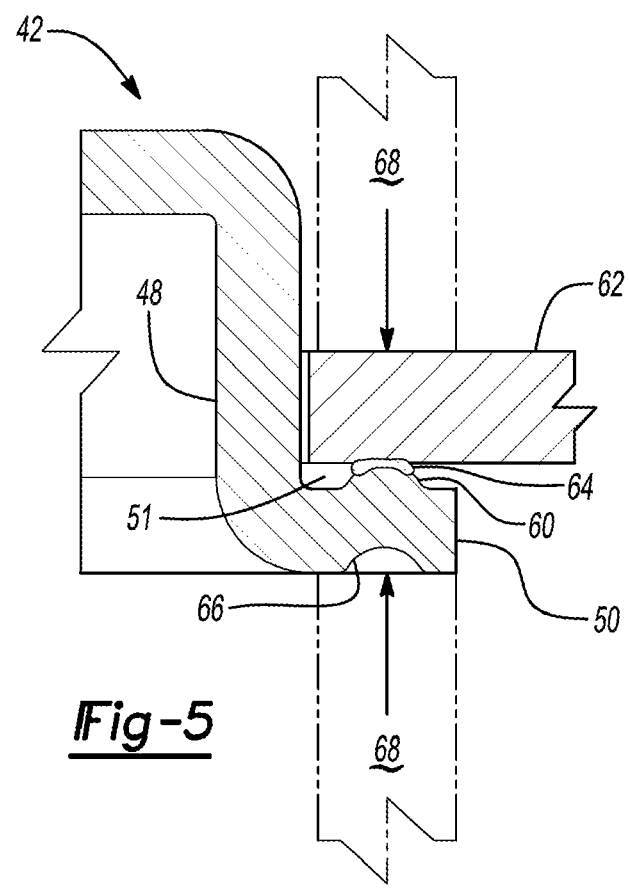
FIG. 5 is an enlarged partial cross-sectional view of FIG. 4, showing the weld between the feed-through and the housing and the forces applied to the feed-through during installation.
Figure 6:
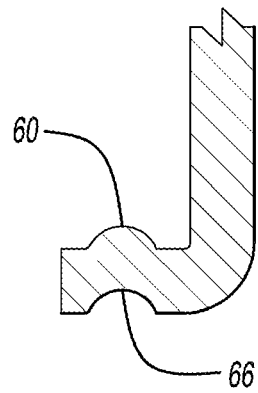
FIG. 6 is an enlarged view of portion A of FIG. 4.

Referring to FIGS. 5 and 6, the annular lip 50 includes a protrusion 60 for engaging a housing 62 of a device (e.g., compressor). The protrusion 60 is disposed along the annular lip 50 to form an annular shape. The protrusion 60 extends upwardly from the annular lip 50 toward the housing 62. An air cap 51 is defined between the annular protrusion, the annular lip, the cylindrical sidewall, and the housing. A weld 64 is formed around the contacting points between the housing 62 and the annular lip 50. The metallic body 42 is generally stamped from cold rolled steel, or the like, and so is the protrusion 60. Therefore, a groove 66 is formed at the annular lip 50 opposing the protrusion 62 as a result of the stamping process.

Figure 7:
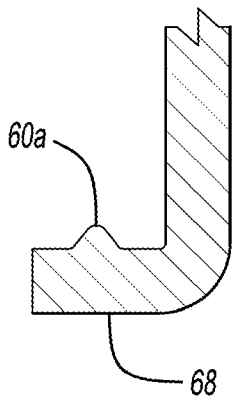
FIG. 7 is a view similar to FIG. 6, showing an alternate portion A.
Figure 8:
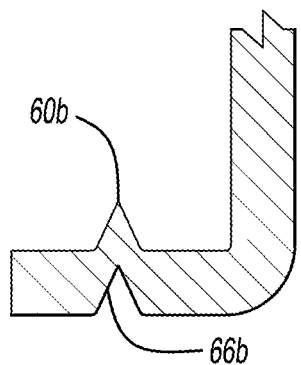
FIG. 8 is a view similar to FIG. 6, showing another alternate portion A.
Figure 9:
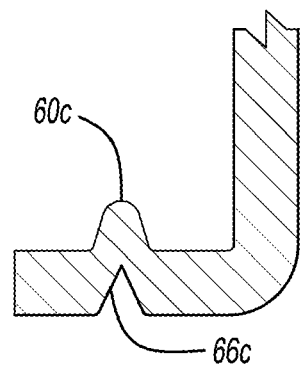
FIG. 9 is a view similar to FIG. 6, showing still another alternate portion A.

Alternatively, the metallic body 42 and the protrusion 60 can be formed by other conventional mechanical methods and thus a groove does not necessarily accompany the protrusion 60. FIG. 7 shows the annular lip 50 has a planar surface 68 opposing a protrusion 60a. Moreover, while FIGS. 6 and 8 show that the protrusions 60 and 60b and the grooves 66 and 66b have the same shape, FIG. 9 shows that the protrusion 60c has a curved shape and the groove 66c has a triangular shape. Regardless, the protrusions 60, 60a, 60b and 60c can have any configuration as long as the protrusions 60, 60a, 60b and 60c protrude from the annular lip 50 and focus the heat in the area adjacent to the protrusions 60, 60a, 60b and 60c. The protrusion 62 prevents the heat generated during the resistance welding process from propagating to the seal 58 and from damaging the seal 58 during installation of the feed-through to the housing 62.

The existence of the protrusion 60 causes less heat to migrate beyond the weld location and toward the interface between the metallic body 42 and/or current-conducting pins 44 and sealing glass 58, thereby reducing the occurrence of heat shock to the feed-through 40 and the seal 58. Reducing heat shock at the glass seal, in turn, enables the feed-through to employ mild carbon steel pins (instead of, for example, 446 stainless steel pins), thereby reducing manufacturing costs of the feed-through.

Apart from preventing heat from propagating to the seal 58, the protrusion 60 also serves to assist in the welding process for better controlling the location and definition of the weld 64 between the metallic body 42 and the housing 58 (e.g., a compressor housing) to which it is attached. Referring back to FIG. 5, the forces are applied by electrodes 68 along a line passing through the protrusion 60 and no bending moment is generated. With an improved positioning of the feed-through 40 relative to the housing 62, the weld location remains the same during the welding process and thus the weld 64 may be made under lower power. Ultimately, then, the service life of the weld electrodes can be significantly increased. Therefore, the power terminal feed-through 40 in accordance with the present disclosure can be reliably and easily manufactured and installed.

Figure 10:
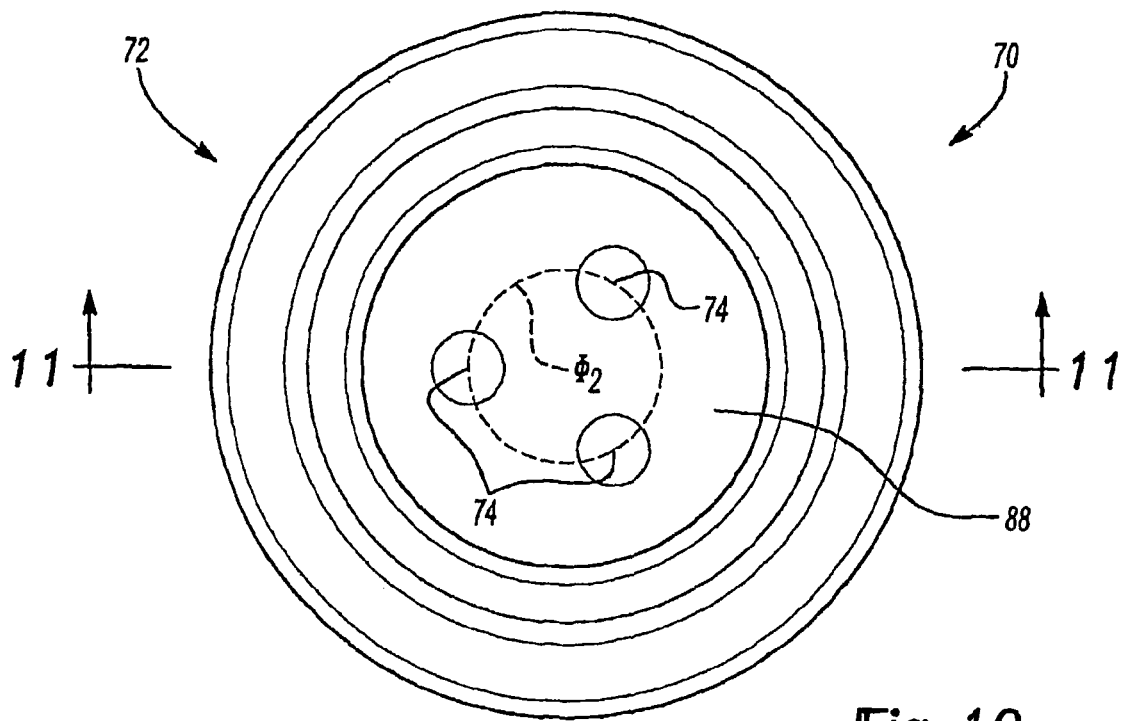
FIG. 10 is a top view of an electric power terminal feed-through in accordance with a second embodiment of the present disclosure.
Figure 11:
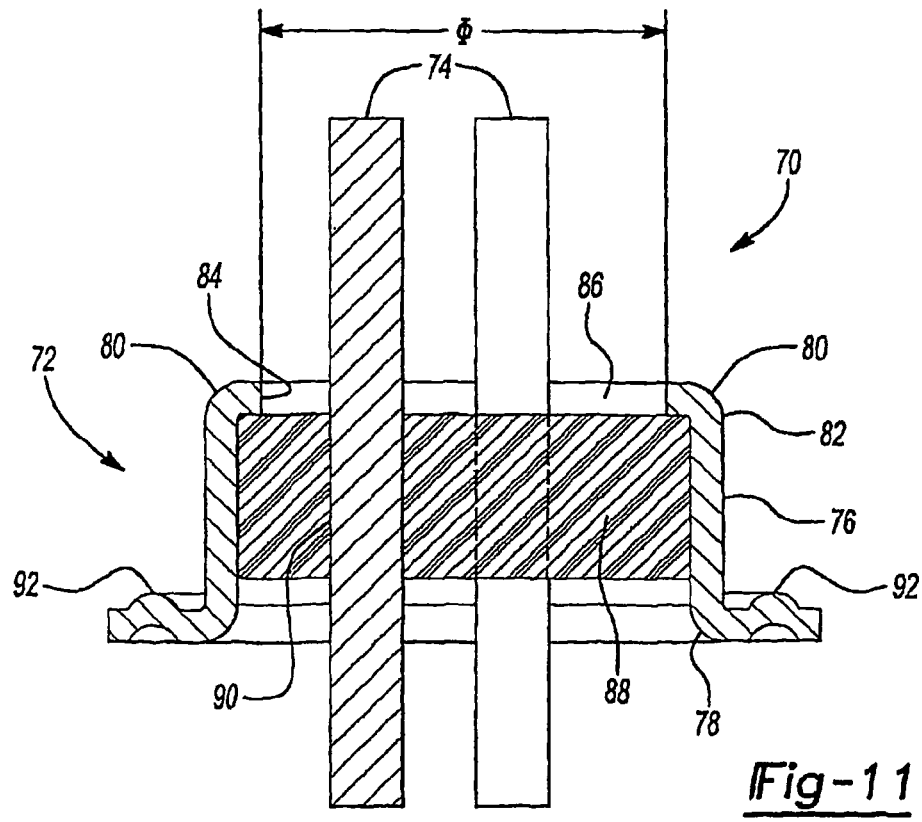
FIG. 11 is a cross-sectional view of the electric power terminal feed-through taken along line 11-11 of FIG. 10.
Figure 12:
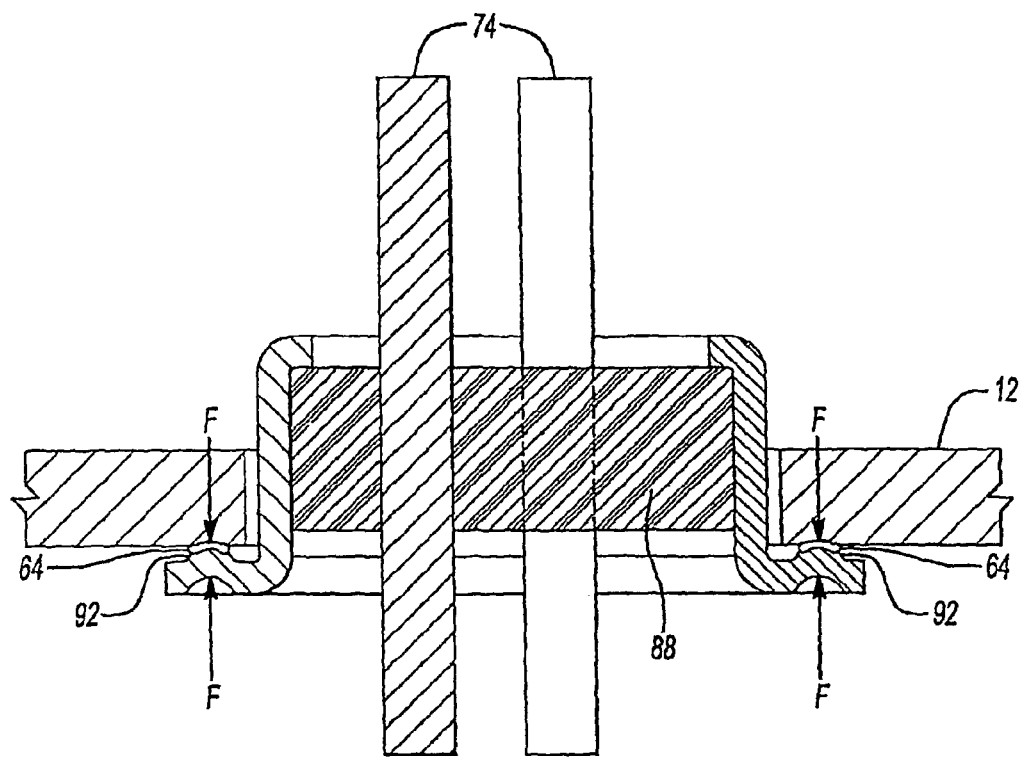
FIG. 12 is a cross-sectional view of the electric power terminal feed-through of FIG. 11, showing installation of the feed-through to a housing.

Referring to FIGS. 10 to 12, a power terminal feed-through constructed in accordance with a second embodiment of the present disclosure is illustrated and generally indicated by reference numeral 70.

Similar to the first embodiment, the power terminal feed-through 70 includes a metallic body 72 and one or more current conducting pins 74 passing through the metallic body 72, wherein the metallic body 72 has a cylindrical sidewall 76 and an annular lip 78 extending radially and outwardly from the cylindrical sidewall 76. Unlike the metallic body 42 of the first embodiment, however, the metallic body 72 of this embodiment does not have a bottom wall. Instead, the metallic body 72 includes a radiused edge 80 connected to a first end 82 of the cylindrical sidewall 76. The radiused edge 80 defines an opening 84. The opening 84 is so dimensioned that one or more current-conducting pins 74 pass through the opening 84 with a proper distance therebetween. The proper distance refers to the minimum electrical spacing from pin to pin and from pin to metallic body, which allows the feed-through 70 to be made smaller, while maintaining the same minimum electrical spacing.

The cylindrical sidewall 76 defines an inner space 86. A single glass insert 88, also referred to as a glass "pre-form," is disposed in the inner space 86 and seats against the radiused edge 80 during the feed-through manufacture. The single glass insert 88 defines one or more apertures 90 to allow the one or more current-conducting pins 74 to pass through and support the current-conducting pins 74 in the metallic body 72. The single glass insert 88 creates the glass-to-metal seal between the metallic body 72 and all of the current-conducting pins 74 and may be hermetic or semi-hermetic and is resistant to heat shock.

The current-conducting pins 74 define a pin circle diameter $\phi_2$, which is the dimension of the circle passing through the center of the current conducting pins 74 as they are centered and spaced on a longitudinal axis of the power terminal feed-through. Comparing FIG. 10 with FIG. 3, in conjunction with FIG. 10, the elimination of the bottom wall enables the current-conducting pins 74 to be closer together. Therefore, $\phi_2$ is smaller than $\phi_1$ and so is the overall size $\phi$ of the feed-through 70. With the provision of a single insert seal and with the elimination of the bottom wall, the size of the terminal feed-through 70 can be reduced by as much as 60% or more over the power terminal feed-through 40 of the first embodiment, while maintaining a satisfactory glass-to-metal seal. The pin circle diameter $\phi_2$ is on the order of about 6.0 mm to about 11 mm.

Another advantage of this construction is that the surface area of the feed-through that is exposed to the high pressure environment of, for example, a compressor, is decreased. Correspondingly, the force acting against the feed-through is also decreased (since the pressure remains constant). Decreased force enables the metallic body 72 to be manufactured from a material having a thickness less than that of a conventional metallic body. Hence, the metallic body may be manufactured on smaller, less expensive tools which can run at higher production speed, thereby increasing manufacturing output.

Referring to FIG. 12, like the feed-through of FIGS. 3 and 4, the annular lip 78 is provided with a protrusion 92 for engaging the housing 62 to prevent the heat generated during the welding process from propagating to the single glass insert 88.

Figure 13:
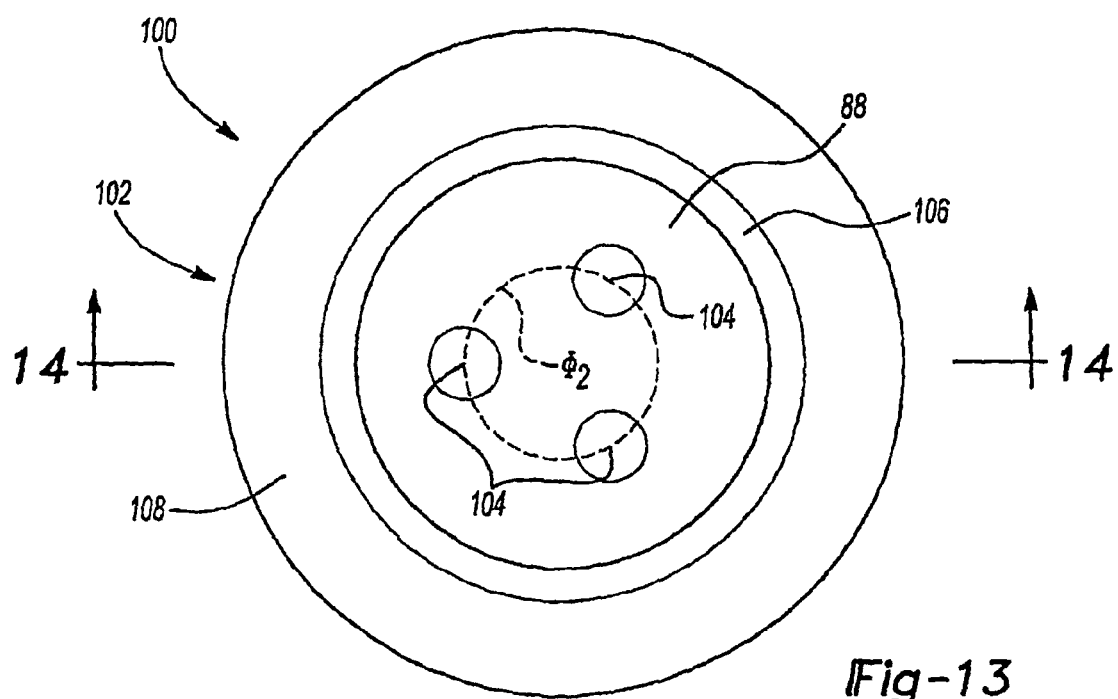
FIG. 13 is a top view of an electric power terminal feed-through in accordance with a third embodiment of the present disclosure.
Figure 14:
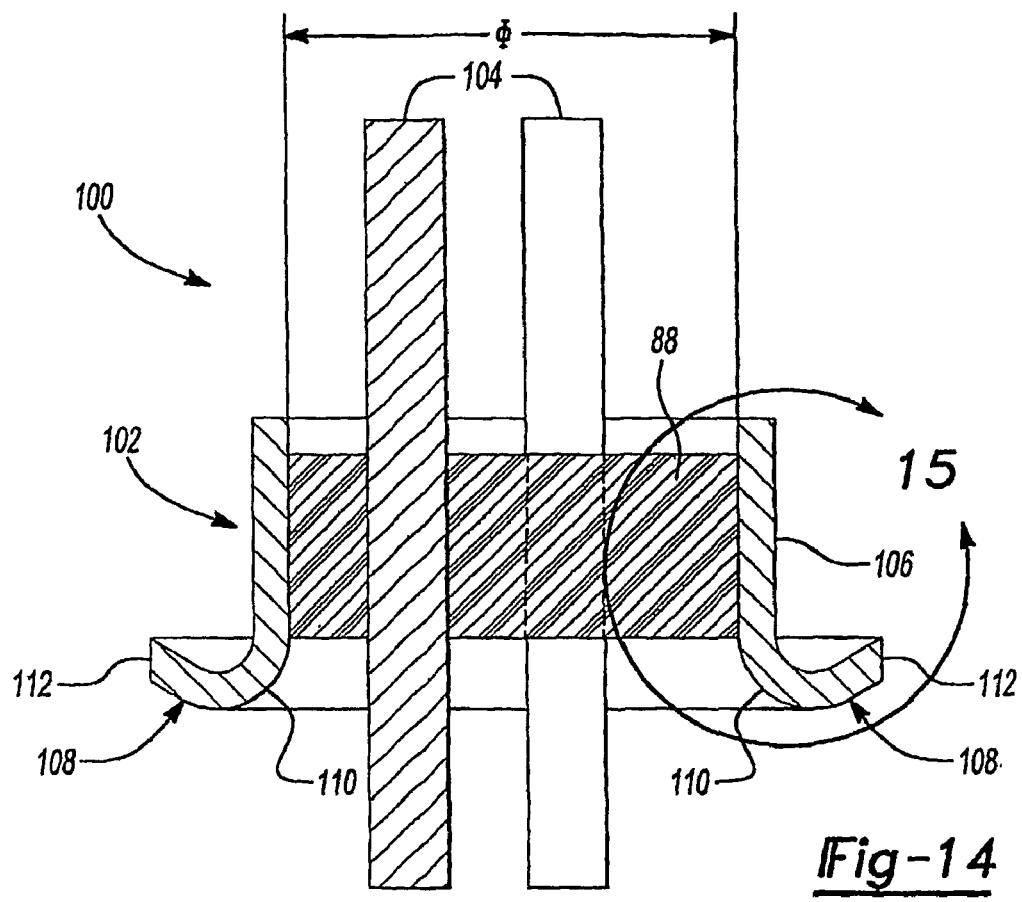
FIG. 14 is a cross-sectional view of the electric power terminal feed-through taken along line 14-14 of FIG. 13.
Figure 15:
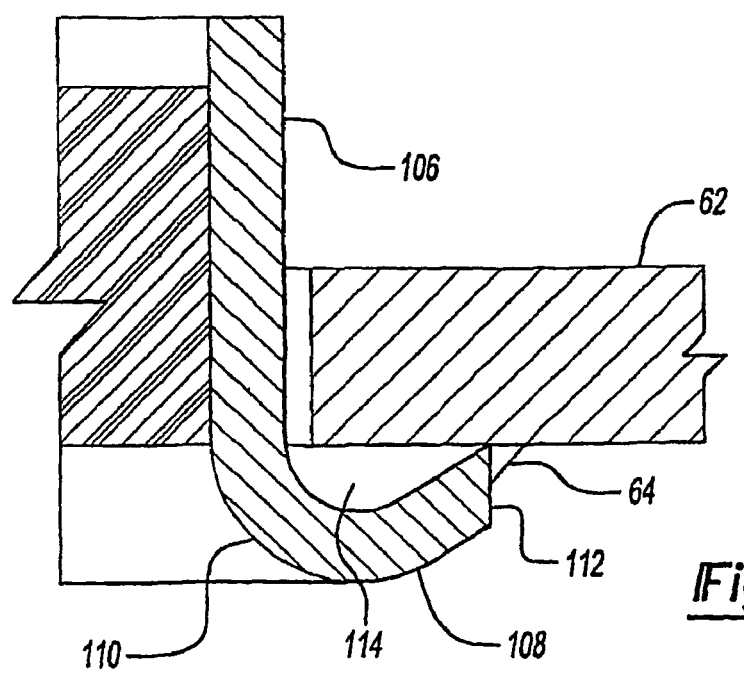
FIG. 15 is an enlarged partial cross-sectional view of FIG. 14, showing the weld between the feed-through and the housing.

Referring to FIGS. 13 to 15, a power terminal feed-through constructed in accordance with a third embodiment of the present disclosure is illustrated and generally indicated by reference numeral 100. The power terminal feed-through 100 includes a metallic body 102 and one or more current-conducting pins 104. Unlike the metallic bodies 42 and 72 of the first and the second embodiments, the metallic body 102 is of a tubular body which does not incorporate either a bottom wall or a radiused edge at the sidewall. More specifically, the metallic body 102 includes a cylindrical sidewall 106, and an annular lip 108 extending from the cylindrical sidewall 106. The annular lip 108 is so connected to the metallic body 102 that the annular lip 108 and the cylindrical sidewall 106 form a curved portion 110 and is bent to form an angle of about 45° relative to the cylindrical sidewall 106. Like the feed-through 70 in FIGS. 10-12, the feed-through 100 of this embodiment has a single insert seal 88 and the current-conducting pins 104 define a pin circle diameter $\phi_2$.

As shown in FIG. 15, the annular lip 108 has a distal end 112 engaging the housing 62. A gap 114 is defined between the housing 62 and the annular lip 108. The weld 64 is formed along the distal end 112 of the annular lip 108 and the heat generated during the welding process tends to be focused at the distal end 112. Since the distal end 112 functions as a "protrusion" to help keep the heat away from the seal, a protrusion is not necessary. The gap 114 also helps reduce the heat migrating into the seal.

Figure 16:
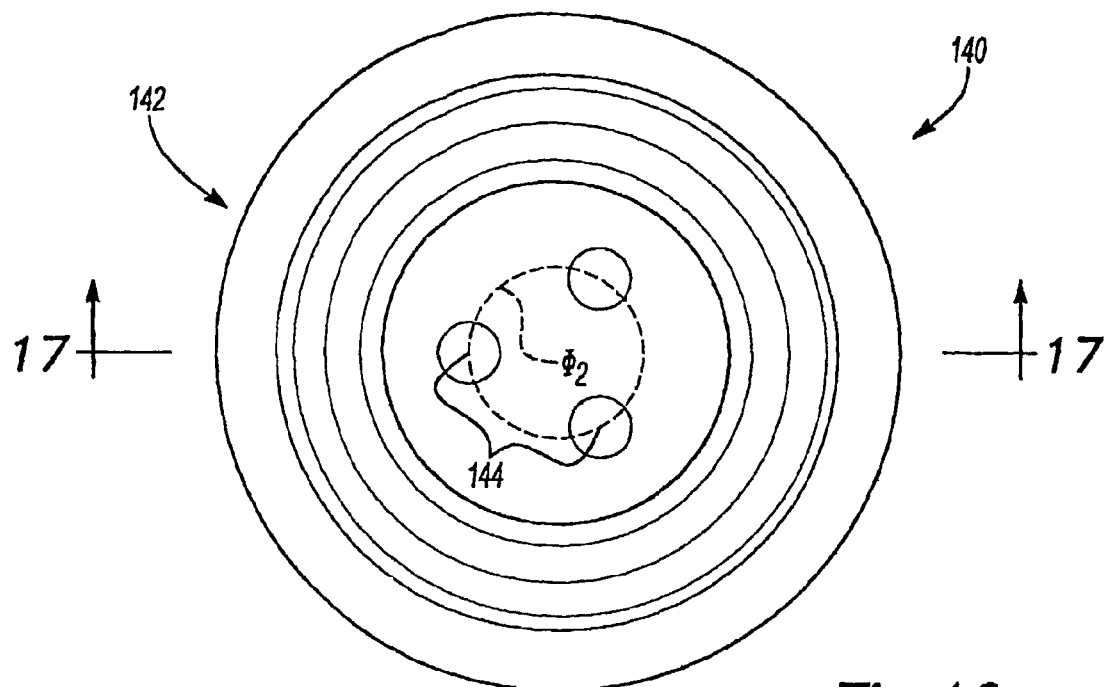
FIG. 16 is a top view of an electric power terminal feed-through in accordance with a fourth embodiment of the present disclosure.
Figure 17:
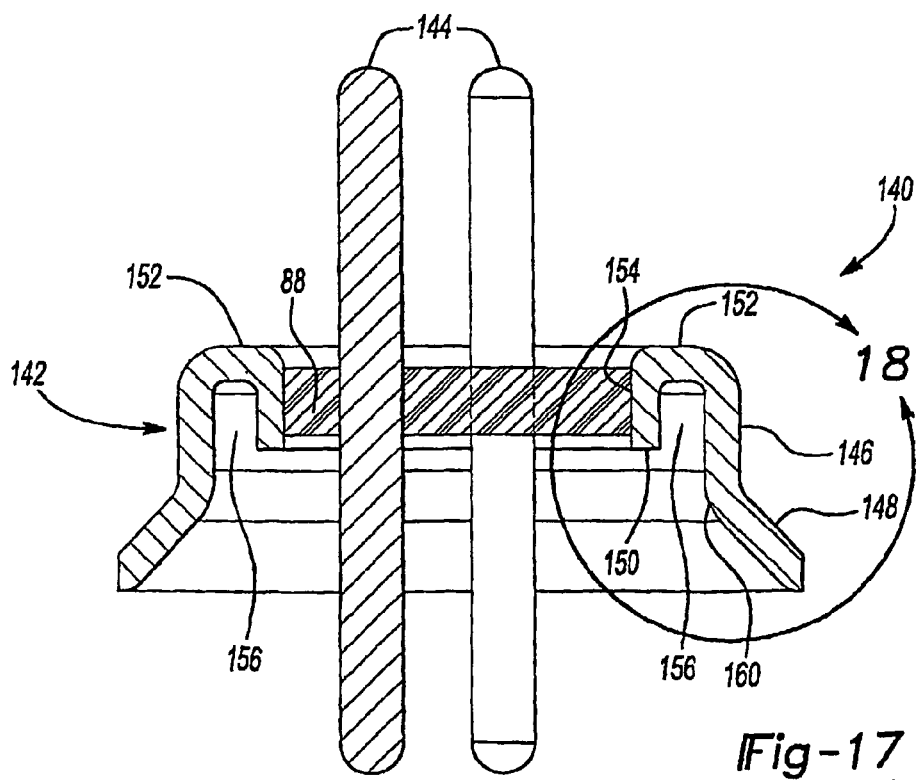
FIG. 17 is a cross-sectional view of the electric power terminal feed-through, taken along line 17-17 of FIG. 16.

Referring to FIGS. 16 and 17, an electric power terminal feed-through in accordance with a fourth embodiment of the present disclosure is illustrated and generally indicated by reference numeral 140. The electric power terminal feed-through 140 includes a metallic body 142 and one or more current-conducting pins 144 passing through the metallic body 142.

The metallic body 142 includes an outer cylindrical sidewall 146, an annular lip 148, an inner cylindrical sidewall 150 and a connecting wall 152. The inner cylindrical sidewall 150 defines a receiving space 154 for receiving a single insert seal 88 therein. The annular lip 148 is flared out from the outer cylindrical sidewall 146 to form an angle of about 135° relative to the outer cylindrical sidewall 146. The outer cylindrical sidewall 146 and the inner cylindrical sidewall 150 define a gap 156.

Figure 18:
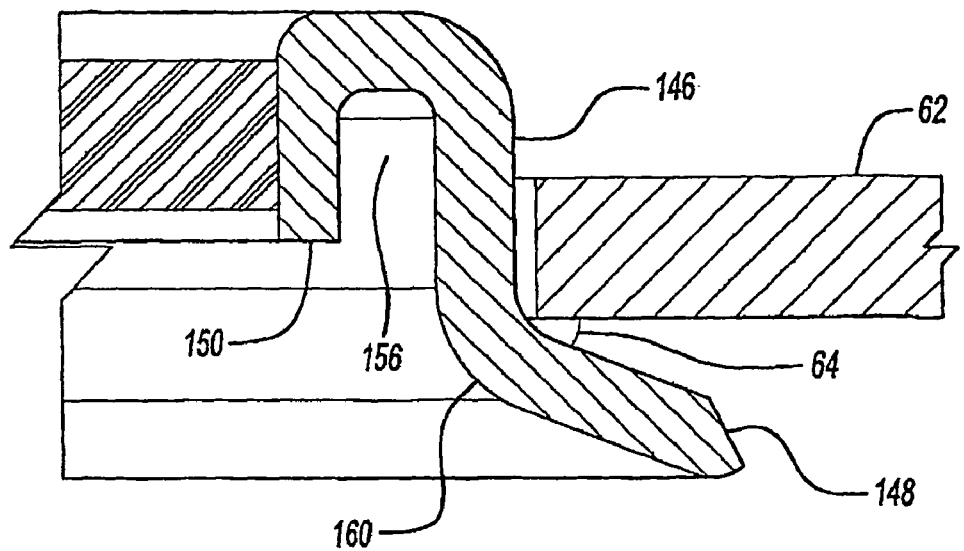
FIG. 18 is an enlarged partial cross-sectional view of FIG. 17, showing the weld between the feed-through and the housing.

As shown in FIG. 18, the weld 64 is formed at the transition portion 160 between the outer cylindrical sidewall 146 and the annular lip 148. Because the existence of the inner cylindrical sidewall 150 and the gap 156, the configuration of this embodiment creates a longer travel distance for the heat to travel from the weld 64 to the single glass insert 88, though the weld 160 is formed adjacent to the outer cylindrical sidewall 146. It results in less heat tending to migrate to the sealing material. While no protrusion is necessary is the present embodiment, it is within the contemplation of the present disclosure that a protrusion is formed to engage the housing 62 to further reduce the heat that might migrate to the seal during the welding process.

Figure 19:
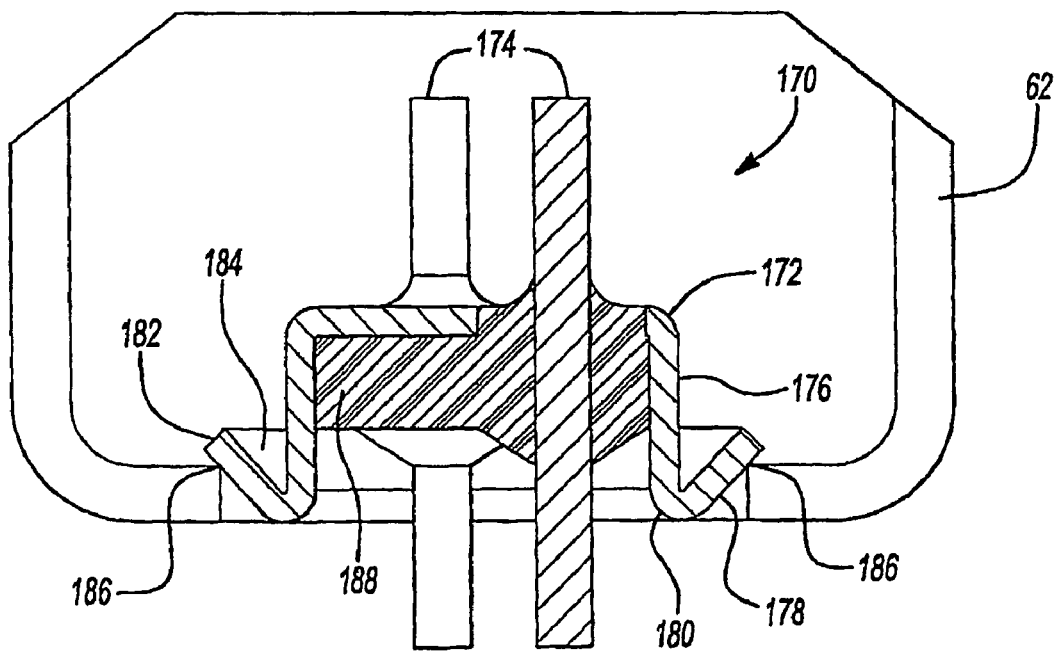
FIG. 19 is a cross-sectional view of an electric power terminal feed-through in accordance with a fifth embodiment of the present disclosure.

Referring to FIG. 19, an electric power terminal feed-through constructed in accordance with a fifth embodiment of the present disclosure is illustrated and generally designated by reference numeral 170. The feed-through 170 includes a metallic body 172 and one or more current-conducting pins 174. The metallic body 172 includes a cylindrical sidewall 176 and an annular lip 178 extending from a second end 180 of the cylindrical sidewall 176 to define an acute angle therebetween, which is shown to be about 45° in FIG. 19. A gap 184 is defined between the cylindrical sidewall 176 and the annular lip 178. The annular lip 178 has a distal end 182 opposite to a transition portion 180 of the cylindrical sidewall 176 and a contacting area 186 disposed between the distal end 182 and the second end 180. A weld (not shown) is to be formed at the contacting area 186. A seal 188 is provided in the space defined by the cylindrical sidewall 176 and the bottom wall.

With the existence of the gap 184 and the annular lip 178, the travel distance for the heat generated during the welding process from the contacting area 186 to the seal 188 is increased, thereby protecting the seal 188 from heat shock and any heat-related damage during installation.

It should be noted that while the figures illustrate that the electric power terminal feed-through in each embodiment is installed to the housing from one direction, for example, from the lower side (or the exterior side) of the housing as shown in FIGS. 12, 15 and 18, or from the upper side (the interior side) of the housing as shown in FIG. 19, it is within the scope of the present disclosure that the power terminal feed-through can be installed from the opposite direction so that the weld is formed on the upper side of the housing in FIGS. 12, 15 and 18 and on the lower side of the housing in FIG. 19.

Moreover, while not shown in the figures, it is understood that the power terminal feed-throughs 40, 70, 100, 140, 170 according to the present disclosure may also incorporate additional features such as a protective oversurface coating (e.g., silicone rubber) on the body, fuse portions in the pins, additional insulators providing oversurface protection for the pins (e.g., ceramic insulators) and connectors adapted to connect the pins to other components.

This description is merely exemplary in nature and, thus, variations that do not depart from the gist of the disclosure are intended to be included within the scope of the disclosure. Further areas of applicability of the present invention will become apparent from the detailed description provided hereinafter. It should be understood that the description and specific examples, while indicating the preferred embodiment(s) of the invention, are intended for purposes of illustration only and are not intended to limit the scope of this disclosure.

What is claimed is:

1. An electric power terminal feed-through adapted to be installed to a housing, comprising: a metallic body including a cylindrical sidewall and an annular lip extending outwardly from an end of the sidewall; at least one current conducting pin extending through the metallic body; and a seal sealing the pin to the metallic body, wherein the annular lip is so configured that the annular lip engages the housing at a location away from the cylindrical sidewall, and wherein the annular lip extends radially from the end of the sidewall to form an angle of about ninety degrees relative to the sidewall, the annular lip including a protrusion for engaging the housing.

2. The electric power terminal feed-through according to claim 1, wherein the annular lip comprises a contacting portion for engaging the housing, a gap being defined between the contacting portion and the cylindrical sidewall.

3. The electric power terminal feed-through according to claim 1, wherein the annular lip extends from the end of the sidewall to form an acute angle relative to the sidewall.

4. The electric power terminal feed-through according to claim 1, wherein the metallic body further comprises a bottom wall connected to the cylindrical sidewall.

5. The electric power terminal feed-through according to claim 4, wherein the bottom wall defines at least one aperture corresponding to the at least one current conducting pin to allow for passage of the at least one current conducting pin.

6. The electric power terminal feed-through according to claim 5, wherein the seal comprises at least one seal element corresponding to the at least one aperture.

7. The electric power terminal feed-through according to claim 1, wherein the metallic body further comprises a radiused edge connected to the cylindrical sidewall, the radiused edge defining an opening to allow for passage of the at least one current conducting pin.

8. The electric power terminal feed-through according to claim 7, wherein the seal sits at least against the radiused edge.

9. The electric power terminal feed-through according to claim 1, wherein the seal is in the form of a preformed single insert.

10. The electric power terminal feed-through according to claim 1, further comprising
    a plurality of current conducting pins; and
    a longitudinal axis extending in the direction of the current conducting pins and passing through the center of the body,
    wherein the pins are spaced about a diameter that is centered on the longitudinal axis, and wherein the diameter is on the order of about 6.0 millimeters to about 11 millimeters.

11. The electric power terminal feed-through according to claim 1, wherein the seal is made of a material including glass.

12. An electric power terminal feed-through comprising: a metallic body comprising: an outer cylindrical sidewall having a first end and a second end, an annular lip extending from the second end of the outer cylindrical sidewall, an inner cylindrical sidewall, and a connecting wall connecting the inner cylindrical sidewall to the first end of the outer cylindrical sidewall; at least one current conducting pin extending through the metallic body; and a seal sealing the pin to the metallic body, the seal disposed within an opening defined by the inner cylindrical sidewall; wherein the inner cylindrical sidewall and the outer cylindrical sidewall define a gap therebetween.

13. The electric power terminal feed-through according to claim 12, wherein the annular lip is flared out to form an obtuse angle relative to the cylindrical sidewall.

14. An electric power terminal feed-through comprising:
    a cylindrical sidewall located in an opening of a housing;
    at least one current conducting in extending through the cylindrical sidewall;
    a seal sealing the at least one in to the cylindrical sidewall;
    an annular lip extending radially and outwardly from the cylindrical sidewall to form an angle of about ninety degrees relative to the cylindrical sidewall; and
    an annular protrusion extending from the annular lip toward the housing and welded to the housing, the annular protrusion stamped from the annular lip so that an annular groove is formed at the annular lip opposing the annular protrusion,
    wherein an air gap is defined between the annular protrusion, the annular lip, the cylindrical sidewall, and the housing.

15. An electric power terminal feed-through adapted to be installed to a housing, comprising: a metallic body including a cylindrical sidewall and an annular lip, the annular lip extending outwardly from an end of the sidewall to form an acute angle relative to the sidewall and such that the annular lip engages the housing at a location away from the sidewall; at least one current conducting pin extending through the metallic body; and a seal sealing the in to the metallic body; wherein the annular lip comprises a distal end opposite to a transition portion of the sidewall and a contacting area between the distal end and the transition portion of the side wall, the contacting area adapted to engage the housing.

16. An electric power terminal feed-through adapted to be installed to a housing, comprising: a metallic body including a cylindrical sidewall, an annular lip, and a curved portion between an end of the sidewall and the annular lip; the annular lip extending outwardly from the end of the sidewall to form an acute angle relative to the sidewall and such that the annular lip engages the housing at a location away from the sidewall; at least one current conducting pin extending through the metallic body; and a seal sealing the pin to the metallic body, wherein the annular lip comprises a distal end opposite to the end of the sidewall, the distal end adapted to engage the housing.

17. The electric power terminal feed-through according to claim 16, wherein the acute angle is about forty-five degrees.

* * * * *

UNITED STATES PATENT AND TRADEMARK OFFICE
CERTIFICATE OF CORRECTION

PATENT NO.       : 7,745,725 B2                              Page 1 of 1
APPLICATION NO. : 11/988270
DATED            : June 29, 2010
INVENTOR(S)      : Franz Dieter Paterek et al.

It is certified that error appears in the above-identified patent and that said Letters Patent is hereby corrected as shown below:

Column 4,
Line 23, "air cap 51" should be --air gap 51--.

Column 8,
Line 45, claim 14, "conduction in" should be --conduction pin--.
Line 47, claim 14, "one in" should be --one pin--.
Line 66, claim 15, "the in" should be --the pin--.

Signed and Sealed this

Fourteenth Day of December, 2010

David J. Kappos
*Director of the United States Patent and Trademark Office*